(12) United States Patent
Jackman

(10) Patent No.: US 10,467,922 B2
(45) Date of Patent: Nov. 5, 2019

(54) INTERACTIVE TRAINING SYSTEM

(71) Applicant: WORLD WIDE PREP LTD., Tel Aviv (IL)

(72) Inventor: Oren Jackman, Tel Aviv (IL)

(73) Assignee: WORLD WIDE PREP LTD., Tel Aviv (IL)

( * ) Notice: Subject to any disclaimer, the term of this patent is extended or adjusted under 35 U.S.C. 154(b) by 0 days.

(21) Appl. No.: 15/564,204

(22) PCT Filed: May 4, 2016

(86) PCT No.: PCT/IB2016/052539
§ 371 (c)(1),
(2) Date: Oct. 4, 2017

(87) PCT Pub. No.: WO2016/178155
PCT Pub. Date: Nov. 10, 2016

(65) Prior Publication Data
US 2018/0130368 A1    May 10, 2018

Related U.S. Application Data

(60) Provisional application No. 62/157,999, filed on May 7, 2015.

(51) Int. Cl.
*G09B 7/00* (2006.01)
*G09B 7/08* (2006.01)
(Continued)

(52) U.S. Cl.
CPC .............. *G09B 7/08* (2013.01); *G09B 5/125* (2013.01); *G09B 7/04* (2013.01)

(58) Field of Classification Search
CPC . G09B 7/00; G09B 7/07; G09B 7/077; G09B 7/08; G06N 5/00
See application file for complete search history.

(56) References Cited

U.S. PATENT DOCUMENTS 8,755,737 B1    6/2014 Galen et al.
2005/0019737 A1    1/2005 Iida et al.
(Continued)

OTHER PUBLICATIONS

International Application # PCT/IB2016/052539 search report dated Aug. 21, 2016.
(Continued)

*Primary Examiner* — Peter R Egloff
(74) *Attorney, Agent, or Firm* — Kligler & Associates

(57) ABSTRACT

A training system (20) includes a memory (34), which holds a general database (36), containing first entries corresponding to training problems and including respective general ranking data based on solutions given by multiple users (22) to the training problems, and multiple personal databases (38), each personal database assigned to a respective individual user and containing second entries corresponding to the training problems and including respective personal ranking data based on the solutions given by the individual user to the training problems. A processor (30) selects the training problems to present to each individual user based on both the general ranking data in the general database and the personal ranking data in the personal database, receives the solutions to the training problems entered by the individual user, and updates both the general ranking data and the personal ranking data responsively to the received solutions.

34 Claims, 5 Drawing Sheets

(51) Int. Cl.
G09B 5/12 (2006.01)
G09B 7/04 (2006.01)

(56) References Cited

U.S. PATENT DOCUMENTS

| | | |
|---|---|---|
| 2005/0227215 A1 | 10/2005 | Bruno et al. |
| 2009/0075246 A1* | 3/2009 | Stevens .................... G09B 7/02 434/322 |
| 2009/0202969 A1* | 8/2009 | Beauchamp ............. G06N 5/02 434/335 |
| 2012/0288845 A1* | 11/2012 | Kumar GL ............. G09B 7/06 434/362 |
| 2013/0109003 A1* | 5/2013 | Lee ........................ G06Q 90/00 434/362 |
| 2014/0045164 A1 | 2/2014 | Kearns |
| 2014/0272905 A1* | 9/2014 | Boersma .................. G09B 7/04 434/362 |
| 2015/0364057 A1* | 12/2015 | Catani ................ G09B 19/0092 434/127 |

OTHER PUBLICATIONS

European Application #16789389.0 search report dated Aug. 10, 2018.

* cited by examiner

| Level | Code | Field | Subfield | % correct | % correct by approach | | | Ave # of sec. | Ave # of sec. by approach | | | # correct answers | # of answers | Tools of approach P | Tools of approach A | Tools of approach L | Reason for mistake |
|---|---|---|---|---|---|---|---|---|---|---|---|---|---|---|---|---|---|
| | | | | | P | A | L | | P | A | L | | | | | | |
| 1 | 3221 | Algebra-Integers | Prime numbers | 100 | 100 | 0 | 0 | 11.01 | 11.01 | 0 | 0 | 13 | 13 | ... | | | |
| 2 | 9908 | Geometry-Quadrilaterals | Squares | 100 | 90 | 0 | 10 | 11.04 | 11.03 | 0 | 11.13 | 15 | 15 | ... | ... | ... | ... |
| 3 | 2150 | Geometry-Quadrilaterals | Squares | 100 | 60 | 20 | 20 | 11.12 | 11.1 | 11.17 | 11.19 | 10 | 10 | ... | ... | ... | ... |
| 4 | 3412 | Algebra-Integers | Even & Odd | 95 | 50 | 25 | 25 | 6.3 | 6.4 | 6.35 | 6.35 | 36 | 40 | ... | ... | ... | ... |
| 5 | 0021 | Geometry-Quadrilaterals | Rectangles | 83.33 | 10 | 30 | 60 | 10.45 | 10.48 | 10.43 | 10.45 | 20 | 24 | ... | ... | ... | ... |
| 6 | 3254 | Geometry-Quadrilaterals | Squares | 75 | 25 | 50 | 25 | 11.04 | 11.02 | 11.04 | 11.06 | 24 | 30 | ... | ... | ... | ... |

| CODE | 3221 | 9908 | 2150 | 3412 | 0021 | 3254 |

FIG. 4B

| CODE | 3221 | 9908 | 3412 | 2150 | 0021 | 3254 |

FIG. 4C

| CODE | 3221 | 9908 | 3412 | 3254 | 2150 | 0021 |

FIG. 4D

| CODE | 3221 | 9908 | 3254 | 3412 | 0021 | 2150 |

INTERACTIVE TRAINING SYSTEM

CROSS-REFERENCE TO RELATED APPLICATION

This application claims the benefit of U.S. Provisional Patent Application 62/157,999, filed May 7, 2015, which is incorporated herein by reference.

FIELD OF THE INVENTION

The present invention relates generally to computerized training, and particularly to systems and methods for adaptive training in problem solving.

BACKGROUND

Adaptive learning is an educational method that uses computers as interactive teaching devices. The computer adapts the presentation of educational material according to the student's learning needs, as indicated by responses to questions and performance of other tasks. Common adaptive learning systems typically choose questions from a question pool for presentation to students according to the objective difficulty level of the questions. For example, the objective difficulty of a question may be calculated on the basis of the percentage of students who answered the question correctly.

SUMMARY

Embodiments of the present invention that are described hereinbelow provide improved systems and method for interactive computerized training.

There is therefore provided, in accordance with an embodiment of the invention, a training system, including a network interface, which is configured to communicate over a network with client computing devices operated by multiple users of the system. A memory is configured to hold a general database, containing first entries corresponding to training problems and including respective general ranking data based on solutions given by the multiple users to the training problems, and multiple personal databases, each personal database assigned to a respective individual user and containing second entries corresponding to the training problems and including respective personal ranking data based on the solutions given by the individual user to the training problems. A processor is configured to select the training problems to present to each individual user based on both the general ranking data in the general database and the personal ranking data in the personal database that is assigned to the individual user, to transmit the selected training problems over the network to a client device operated by the individual user, to receive the solutions to the training problems entered in the client device by the individual user, and to update both the general ranking data and the personal ranking data responsively to the received solutions.

In the disclosed embodiments, the processor is configured to update the general and personal ranking data responsively to numbers of correct and incorrect solutions entered by the users. Additionally or alternatively, the processor is configured to update the general and personal ranking data responsively to times taken by the users to enter the solutions.

In some embodiments, the processor is configured, upon receiving a solution to a given training problem that is incorrect from the individual user, to prompt the individual user to enter metadata regarding the incorrect solution, and to enter the metadata in an entry corresponding to the given training problem in the general database. In a disclosed embodiment, the processor is configured, in response to the incorrect solution, to update the personal ranking data with respect to a plurality of the entries in the personal database to which the metadata applies. Additionally or alternatively, the metadata includes a reason for having made a mistake in giving the incorrect solution.

In the disclosed embodiments, the solutions are classified in the general database according to solution approaches. In one embodiment, the training problems include multiple-choice questions used in aptitude tests, and the solution approaches include precise, alternative, and logical approaches.

Additionally or alternatively, at least some of the training problems have multiple solution approaches, and the general ranking data include ranking information with respect to each of the multiple solution approaches for the at least some of the training problems. In a disclosed embodiment, the ranking information is indicative of numbers of correct solutions and times taken by the users to enter the solutions by each of the multiple solution approaches.

Further additionally or alternatively, the processor is configured to evaluate an aptitude of each individual user in each of the solution approaches according to the solutions entered by the individual user. Typically, the processor is configured to select the training problems to present to each individual user based on the evaluated aptitude and the solution approaches of the training problems.

There is also provided, in accordance with an embodiment of the invention, a method for training, which includes establishing communications over a network between a training server and client computing devices operated by multiple users. A general database is maintained, containing first entries corresponding to training problems and including respective general ranking data based on solutions given by the multiple users to the training problems. Multiple personal databases are maintained, each personal database assigned to a respective individual user and containing second entries corresponding to the training problems and including respective personal ranking data based on the solutions given by the individual user to the training problems. The training problems to present to each individual user are selected based on both the general ranking data in the general database and the personal ranking data in the personal database that is assigned to the individual user. The selected training problems are transmitted from the server over the network to a client device operated by the individual user. The server receives the solutions to the training problems entered in the client device by the individual user and updates both the general ranking data and the personal ranking data responsively to the received solutions.

There is additionally provided, in accordance with an embodiment of the invention, a computer software product, including a computer-readable medium in which program instructions are stored. The instructions, when read by a computer, cause the computer to establish communications over a network with client computing devices operated by multiple users, to maintain a general database, containing first entries corresponding to training problems and including respective general ranking data based on solutions given by the multiple users to the training problems, and to maintain multiple personal databases, each personal database assigned to a respective individual user and containing second entries corresponding to the training problems and including respective personal ranking data based on the solutions given by the individual user to the training problems. The instructions cause the computer to select the training problems to present to each individual user based on both the general ranking data in the general database and the personal ranking data in the personal database that is assigned to the individual user, to transmit the selected training problems over the network to a client device operated by the individual user, to receive the solutions to the training problems entered in the client device by the individual user, and to update both the general ranking data and the personal ranking data responsively to the received solutions.

The present invention will be more fully understood from the following detailed description of the embodiments thereof, taken together with the drawings in which:

BRIEF DESCRIPTION OF THE DRAWINGS

FIG. 2 is a table that schematically illustrates the structure of a general database, in accordance with an embodiment of the invention;

FIGS. 4A-D are block diagrams that schematically illustrate steps in a process of updating a personal database, in accordance with an embodiment of the invention.

DETAILED DESCRIPTION OF EMBODIMENTS

Overview

Figure 1:
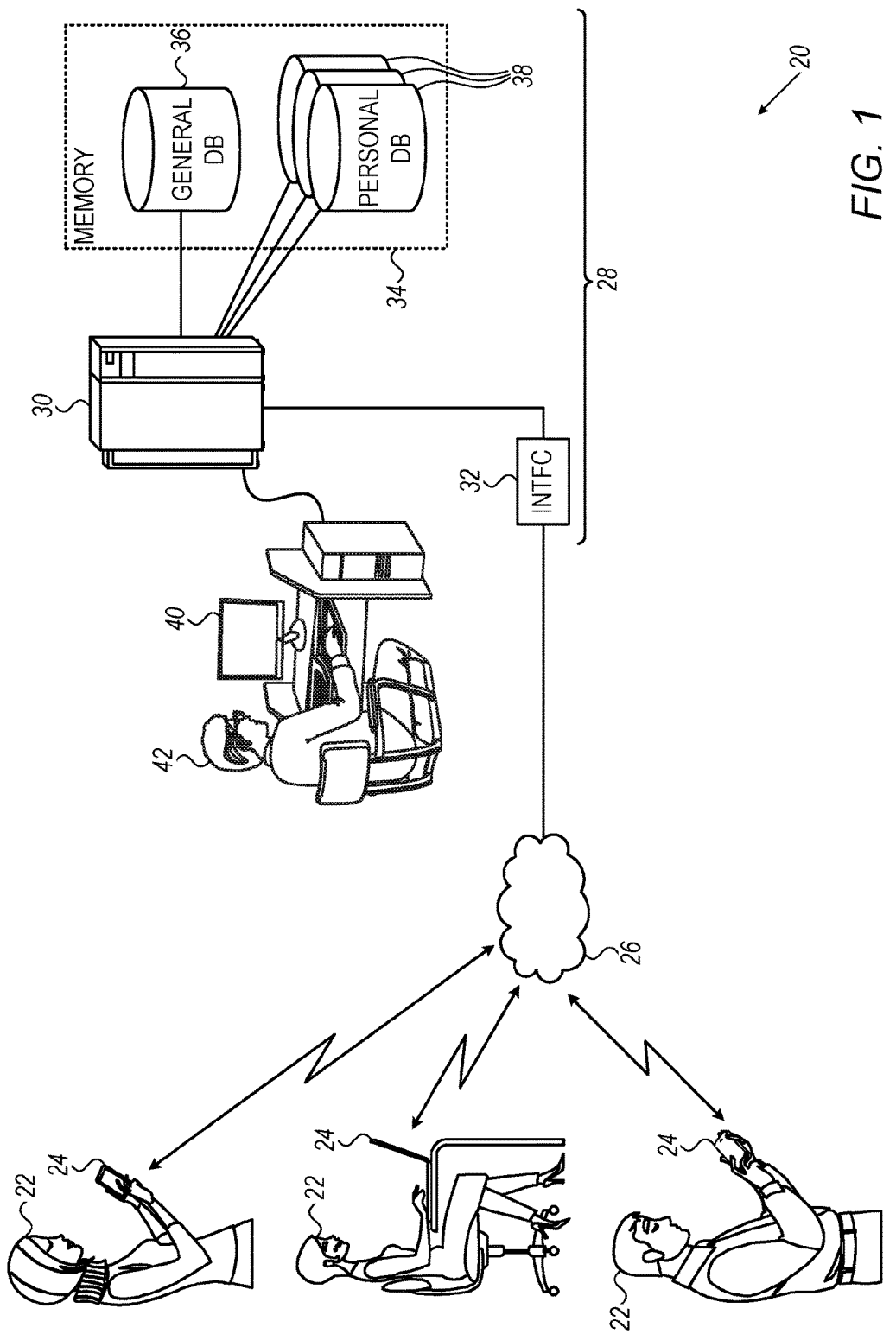
FIG. 1 is schematic, pictorial illustration of a system for interactive training, in accordance with an embodiment of the invention.

Embodiments of the present invention that are described herein provide systems and methods that train users to optimize their problem-solving capabilities by correlating general and personal databases. The general database reflects the "wisdom of the crowd," based on answers to training problems given by a large population of users. The personal database evolves individually for each user based on his or her own experience in solving the training problems. Thus, when choosing the next question to pose to a given user, the system takes into account both the objective and the subjective difficulty levels of the questions for this specific individual. By the same token, in choosing which solution to show the user (out of many different possible solutions to a given problem), the system takes into account the accumulated data on the characteristics of the solutions that the user applied when answering correctly and the characteristics of the questions that he answered wrong, so that the chosen solution fits the individual user's abilities. Both the personal and the global databases are then updated depending upon the user's answer.

In the disclosed embodiments, the system classifies and chooses questions for each user based not only on difficulty, but also on the solution approach, i.e., the types of tools applied in solving the problem. For example, in multiple-choice aptitude tests, such as those given in university admission exams, solution approaches may be classified as precise, alternative, and logical (as explained in greater detail hereinbelow). Many questions will be solvable by more than a single approach, and in each approach by several different tools. For example, the "alternative" approach can include tools such as "using the answers," "estimating the answer," "picking a number," etc. The system stores the possible solution approaches for each question in the general database, and rates them according to the success rates and speed of the users in applying each approach to the question.

Based on this information and on the accumulated experience of each individual user, the system is able to forecast the best tool in each solution approach for the user, i.e., the tool that will most probably result in a fast and correct solution. It applies this forecast in maximizing the efficiency of a problem-solving practice session both by exposing the user to the solutions that are best for him or her and by enabling the selection of the best next practice question according to the optimal solution characteristics.

Thus, the disclosed embodiments combine objective and subjective measures of difficulty with multiple different solution tools to provide a training environment that adapts automatically to the different capabilities, skills and objectives of a large number of users. The end result is that the users' computing devices become personalized tools for perfecting their problem-solving abilities most effectively and efficiently, while the general database becomes the core of a social network that provides the best solutions that also proved to be the fastest ones. Each user thus learns to identify the solution tools that will work best for him or her when faced with various types of problems, rather than assuming that the same approach will be best for all users as in systems that are known in the art.

System Description

FIG. 1 is schematic, pictorial illustration of a system 20 for interactive training, in accordance with an embodiment of the invention. System 20 serves multiple users 22, using respective client computing devices 24, such as desktop or laptop computers, tablet computers, or smart phones. Computing devices 24 communicate over a network 26, such as the Internet, with a training server 28, which transmits training problems to the users and receives their solutions over the network. Server 28 is pictured here, for the sake of clarity, as a single, dedicated entity. Alternatively, however, the functions of server 28 may be distributed among the processing and storage facilities of a larger cluster of computers, such as in a cloud computing infrastructure.

Server 28 comprises one or more processors 30, connected by a network interface 32 to communicate over network 26 with client computing devices 24. Processor 30 typically comprises a general-purpose computer processor, which is programmed in software to carry out the functions described herein. This software may be downloaded to server 28 in electronic form, over a network, for example. Additionally or alternatively, the software may be stored on tangible, non-transitory computer-readable media, such as magnetic, optical, or electronic memory media.

Processor 30 is coupled to a memory 34, which typically comprises volatile and non-volatile components, and stores a general database 36 and multiple personal databases 38. As described in greater detail hereinbelow, general database 36 contains entries corresponding to training problems that are transmitted by processor 30 to client devices 24. Each entry comprises, inter alia, general ranking data with respect to the training problems, based on the solutions given by users 22 to the problems. Each personal database 38 is assigned to a respective individual user 22 and contains entries that likewise correspond to the training problems in general database 36 but comprise personal ranking data based on the solutions given by the individual user to the training problems.

Processor 30 selects the training problems to present to each individual user 22 based on both the general ranking data in general database 36 and the personal ranking data in the personal database 38 that is assigned to the individual user. For each user 22, the processor transmits the selected training problems over network 26 to the client device 24 operated by the individual user, typically in the form of data packets, and receives the solutions to the training problems entered in the client device by the individual user. Based on these solutions and associated metadata—such as the solution approach chosen by the user, the amount of time that the user took to enter the solution, and whether or not the solution was correct—processor 30 updates both the general ranking data in general database 36 and the personal ranking data in personal databases 38.

Typically, server 28 also comprises a user interface 40, which may be local to the server as shown in FIG. 1, or alternatively remotely deployed, via network 26 for example. A system operator 42 uses interface 40 to input problems and suggested solutions to server 28, as well as to screen inputs received from users 22 before adding them to general database 36.

In the present example, for the sake of clarity and concreteness, system 20 is assumed to be directed to training users 22 to improve their scores in multiple-choice aptitude tests, such as those given in university admission exams. The training problems are thus referred to equivalently as "questions," while the solutions are "answers." In this context, solution approaches may be classified using a model that includes precise, alternative, and logical types, any or all of which may be appropriate for a particular problem:

Precise is the general approach to all questions in which an algebraic simplification can be used to find the answer precisely, such as "(½−⅓)/(⅙)=?"

Logical is the implementation of a general rule without any calculations in questions such as: "If x and y are integers, xy must be odd only when –." (The logical rule states that the product of integers is odd only when all of the integers are odd.)

Alternative is the approach that enables the user to skip complicated calculations by taking a shortcut. For example, in questions such as "2145×589=?", the multiple-choice answers can be used to find the correct answer quickly without calculations, with the help of tools such as approximation or looking at the last digit.

"Tools" in this context refers to principles, formulas and rules of thumb that can be used in identifiable instances.

This sort of classification of solutions is not limited to university admission exams and can be applied in other fields of knowledge, as well, although possibly with a different set of general solution approaches that the operator of system 20 can define. For example, in the field of dynamics in logistics, solutions can be classified into formation and sequencing approaches. In locksmithing, solutions may be mechanical, analogical or electrical. In batch programming techniques, solutions may be based on knowledge-based heuristics, mathematical programming, or hybrid approaches.

Usually, not all general solution approaches can be used in solving each problem. Therefore, a key purpose of training—which is facilitated by embodiments of the present invention—is to develop each user's ability to quickly choose the best possible solution tool for each problem, based on both the objective features of the problem and the user's subjective skill set. Processor 30 evaluates the aptitude of each individual user 22 in each of the solution approaches according to the solution tools that the user enters, and then selects further training problems to present to the user based on this evaluated aptitude and the solution approaches appropriate to the training problems. As the user's skills improve (or, at times, weaken) over time, the evaluation changes, and with it the choices of problems for further training sessions.

Server 28 supports a tagging system, which system operator 42 can use to tag each question with possible tools for finding the correct solution and possible reasons for mistakes, which lead to incorrect answers. After user 22 gives a correct answer to a question in the improvement or optimization phase (as defined below), server 28 prompts the user to input the tools used in finding the correct answer. The user can typically select a tool from a set of tools that were tagged by operator 42 or can suggest a new tool that was not tagged. The new suggested tool will be reviewed by operator 42, who may then tag this new tool to the question as an additional tool that will be available for future users 22.

When the user answers incorrectly, server 28 may also prompt the user to input the reason for the mistake, either by selection from a set of mistakes that were tagged by operator 42 or by suggesting a new reason. These new reasons will also be reviewed by the operator and may thus be tagged as mistake reason options for the question, which will then be available to future users 22.

Data Structures

FIG. 2 is a table that schematically illustrates the structure of general database 36, in accordance with an embodiment of the invention. Each entry, occupying a row in the table shown in the figure, corresponds to a respective problem, ranked in terms of the level of difficulty (either as an ordinal value, as in FIG. 2, or a score). The ranking depends upon the percentage of correct solutions returned by users who answered the problem, as well as the average time it took them to answer. Personal databases 38 are organized in a similar fashion, except that the ranking of the entries depends upon the relative difficulty of the problems for each individual user.

General database 36 sets the initial structure and ranking of the entries in each personal database 38 and continues to update its own structure and that of the personal databases based on the accumulated interaction between server 28 and users 22. By the same token, changes in personal databases 38 due to users' correct and incorrect answers to training problems are reflected back to the rankings in the general database. An example scenario in which rankings of database entries are updated is described hereinbelow with reference to FIGS. 4A-D.

Each entry in database 36 also contains information regarding the solution approaches applied by users 22 in solving each of the training problems. As noted earlier, in the present example, the solutions are classified in the database according to "precise," "alternative" and "logical" solution approaches (labeled P, A and L, respectively in FIG. 2), and at least some of the training problems have multiple solution approaches. For these multi-approach problems, the ranking data in the corresponding entries in database 36 comprise ranking information with respect to each of the applicable solution approaches. In the example shown in FIG. 2, this ranking information indicates the percentages (or equivalently, the relative numbers) of correct solutions and times taken by the users to enter these solutions by each of these solution approaches.

The entries in database 36 are tagged according to specified factors that are useful in compiling a tailor-made practice for each individual user 22. In the particular example that is shown in FIG. 2, these tags include:

- A four-digit identifying code.
- Field of knowledge (for example, "Geometry—Quadrilaterals").
- Subfield ("Squares").
- Percent of correct answers among users who attempted to solve this problem.
- Number of correct answers and number of all answers ("19 correct answers out of 23 answers").
- Average number of seconds taken by correct answers to submit their answer.
- Percent of correct answers for each general solution approach ("Precise approach—20% of all correct answers; Alternative approach—30%; Logical approach—50%").
- Average number of seconds for correct answers for each general solution approach.
- Available solutions for each general solution approach, including the major tool used for answering the question within each solution approach and possibly additional tools, if available, as well as relevant rules used for answering the question.
- The reasons for not answering correctly ("Calculation mistake"; "Confusion with a similar formula.")

Typically, the initial tags and suggested solutions are written by an expert. Users are then prompted to enter additional, qualitative information with respect to questions they have answered or attempted to answer, including suggestions for other solutions, tools, and causes for mistakes. This information is generally sent to operator 42 and screened before being entered in the database.

Methods of Operation

Figure 3:
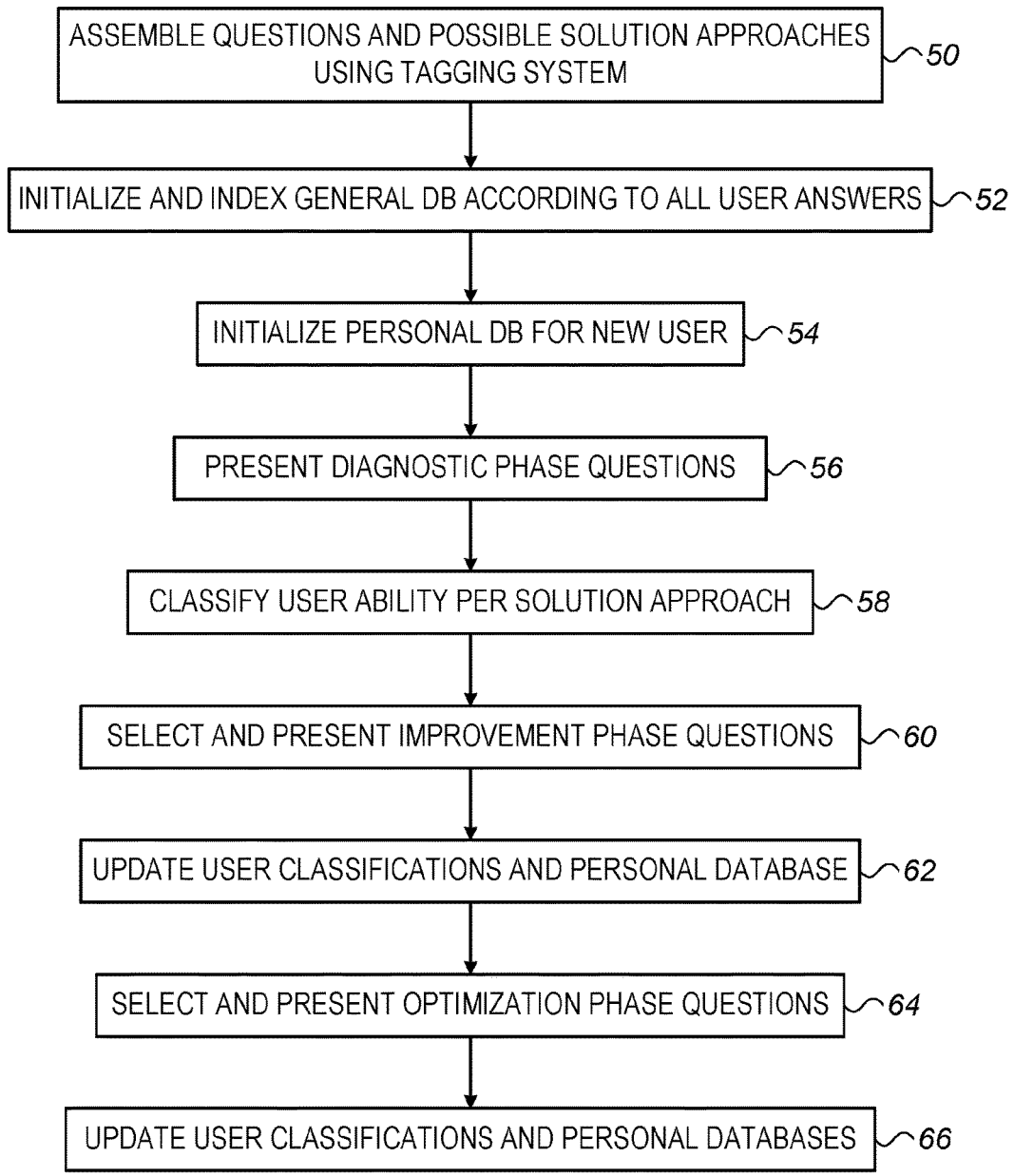
FIG. 3 is a flow chart that schematically illustrates a method for interactive training, in accordance with an embodiment of the invention.

FIG. 3 is a flow chart that schematically illustrates a method for interactive training using system 20, in accordance with an embodiment of the invention. This method represents one example of a process by which server 28 can automatically form an assessment of the abilities of a particular user 22, and then tailor a training program accordingly for that user, while at the same time updating databases 36 and 38. Alternatively, the principles described above can be applied in implementing other training techniques, as will be apparent to those skilled in the art after reading the present description. All such alternative implementations are considered to be within the scope of the present invention.

As an initial matter, server 28, under the supervision of operator 42, assembles a corpus of training problems, in the form of questions and answers, at a problem assembly step 50. Operator 42 uses the tagging system to associate with each question possible solution approaches and tools for reaching the correct answer. Server 28 initializes general database 36 with entries corresponding to the training problems, at a general database initialization step 52. The entries are indexed, and rankings are developed and entered in the general database on the basis of answers to the questions that are returned to server by users 28.

When a new user 22 joins system 20, server 28 initializes a personal database 38 for this user, at a personal database initialization step 54. Initially, before the new user has begun to answer questions, the ranking of the entries in the personal database is based on, and possibly identical to, the current ranking in general database 36. Subsequently, the general and personal rankings typically diverge, as described hereinbelow.

User interaction with system 20 is divided, in the present example, into three phases, in which server 28 first evaluates the user's aptitude in different fields and in each of the different solution approaches, and then selects the training problems to present to the user based on the results of this evaluation and on the fields and solution approaches of the available training problems. The phases of user interaction include:

1. The diagnostic phase—Server 28 assesses the user's competence in answering questions in a defined field of knowledge and a number of predetermined major solution approaches.
2. The improvement phase—Server 28 improves the user's competence in answering questions in the defined field of knowledge using questions that are most likely to be solved by one specific major solution approach—the approach that was found to be most useful to correct answers in giving the fastest answers.
3. The optimization phase—Server 28 enhances the user's level of competence by creating tailor-made practice sessions and offering the one solution tools that is best (i.e., fastest and most likely to lead to correct answers) for the specific user.

In the diagnostic phase, server 28 selects each question from the general database 36 according to the major solution approach that has been found to have the fastest average time for solution, at a diagnostic question selection step 56. Since in most cases, not all general solution approaches can be used for solving each question, a major purpose of practice is to develop the user's ability to quickly choose the best possible alternative; and the questions in the diagnostic phase are chosen so as to assess which alternative is likely to be best for this particular user.

Based on the user's answers to the test problems in this phase, server 28 classifies the user's ability in each solution approach, at a classification step 58. For example, if the specific lesson is "Integers," server 28 diagnoses the user's ability in solving integer problems in each of the three major solution approaches, and indicates the user's level on a certain scale (such as a ten-point scale). Thus, for instance, after solving a number of questions, an individual user may be classified as "7" in "Precise," "6" in "Alternative," and "4" in "Logical."

In the improvement phase, server 28 selects questions from general database 36 according to the major solution approach that has the fastest average time, at an implementation question selection step 60. Based on the measurement by the system of the user's ability in each of the major solution approaches at step 58 in the diagnostic phase, server 28 selects harder, similar or easier questions in the improvement phase. The selection may be adaptive, for example selecting a harder question after each time the user answers correctly, repeating a same-level question once in three questions, etc. Thus, a user who was classified as "7" in fast "precise" solutions may practice "8" to "10" questions as long as he succeeds, and "6" to "1" questions if he regresses. Based on the user's answers, server 28 updates the user's personal database 38, as well as solution approach classifications, at a data update step 62.

Finally, in the optimization phase, server 28 chooses questions from the user's personal database 38, at an optimization question selection step 64. The selection is based on the rankings of the training problems that were developed during the improvement phase, and which are updated continually during the optimization phase. The problems are selected so as to develop the user's ability to find the fastest solution approach with which to answer as many questions as possible in a fast and correct manner. A solution is considered "best" if, according to the user's history combined with the experience of all users, it is most likely to help him or her solve similar questions quickly and correctly in the future. Based on the user's answers to the questions presented in step 64, server 28 updates both the user's personal database 38 and general database 26, as well as solution approach classifications, at a database update step 66.

As an example of updating general database 36, observe that the ranking of the entries shown in FIG. 2 is arranged from easiest (with 100% correct answers) to most difficult. The first three entries, all of which had 100% correct answers, are ranked in order of the average time taken by users 22 to answer, from fastest to slowest. Now assume that a given user answers the question identified by code #2150 incorrectly. Instead of 10 out of 10, the ratio of correct answers to all answers for this question now drops to 10 out of 11, which is 90.91%, so that this question is now considered harder than #3412, which was answered correctly by 95% of the users. Thus, the two questions switch places in the database.

The user who gave the wrong answer may also enter metadata in order to tag the reason for the user's mistake in giving the incorrect solution (for example, "calculation mistake"). These tags may have been proposed to the user by server 28, or they may be entered by the user as free text. In either case, the user metadata selections are entered in the last two columns of database 36, as shown in FIG. 2. When users enter tags as free text, operator 42 will proofread the suggested tags and unify them. Server 28 will then be able to use the similarity between tags in the next step of updating personal database 38.

FIGS. 4A-D are block diagrams that schematically illustrate steps in a process of updating personal database 38, in accordance with an embodiment of the invention. FIG. 4A shows database 38 in its initial state, in which the ranking of entries 70 is identical to that in general database 36. When user 22 answers question #2150 incorrectly, it is demoted to a position below question #3412, as shown in FIG. 4B, as in the general database.

Next, server 28 considers the metadata tags entered by the user regarding the reason for the mistake ("calculation mistake"), and demotes all entries that share these tags. Thus, in FIG. 4C, assuming question #0021 shares the tag "too many shapes," both question #2150 and #0021 are demoted by one level in the rankings. Similarly, in FIG. 4D, assuming question #3412 to share the tag "calculation mistake," both questions #2150 and #3412 are demoted. Although the demotions shown in FIGS. 4C and 4D are each by a single level in the rankings, server 28 may alternatively demote entries 70 in these stages based on different formulas, for example by a predefined number of levels greater than one. Thus, personal database 38 adapts quickly to the particular types of difficulties encountered and errors committed by the particular user in question, and server 28 is able to choose questions in an order that will optimally build the user's ability to answer future questions correctly.

Instead of directly promoting and demoting the entries in general and personal databases 36 and 38, the training problems can be indexed according to scores that are indicative of their levels of difficulty. In general database 36, each question is scored by the percent of users who answered it correctly using each general approach. In personal database 38, each question is scored by a number that changes according to the individual user's success or failure in answering correctly.

For example, all questions in personal database 38 can start with the same subjective score of 100. If the user answered a question correctly using a certain tool, the subjective scores of all the questions that are tagged with the same tool are divided by a pre-defined value f (f>1). For example, if f=1.25, the new score of all the questions that can be solved using the same tool will be 100÷1.25=80. If the user answered a question incorrectly for a certain reason, the subjective scores of all the questions that are tagged with the same reason are multiplied by a pre-defined value s (s>1). For example, if s=1.4, the new score of all the questions that are tagged as having been answered incorrectly for the same reason will be 100×1.4=140.

Based on this approach, only the general, objective score is used in choosing the training problems to present in the diagnostic phase and the improvement phase (steps 56 and 60 in FIG. 3) and in presenting the user with the correct solution when the user answers incorrectly. In the individualized optimization phase (step 64), however, a solution is considered efficient if its "effectiveness score" is the highest among the general solution approaches:

Effectiveness score=(General score)×(Personal score)

For example, if 90% of the users who gave correct answers to a given question used solution approach A, and if a certain user's personal score for approach A in this question is 80, then the effectiveness score for answering this question using approach A is 90%×80=72. Thus, if the user chooses an incorrect solution in the optimization phase, server 28 will choose the solution found by the solution approach having the highest effectiveness score for this user, and will present this solution to the user as the preferred, correct solution.

Figure 5:
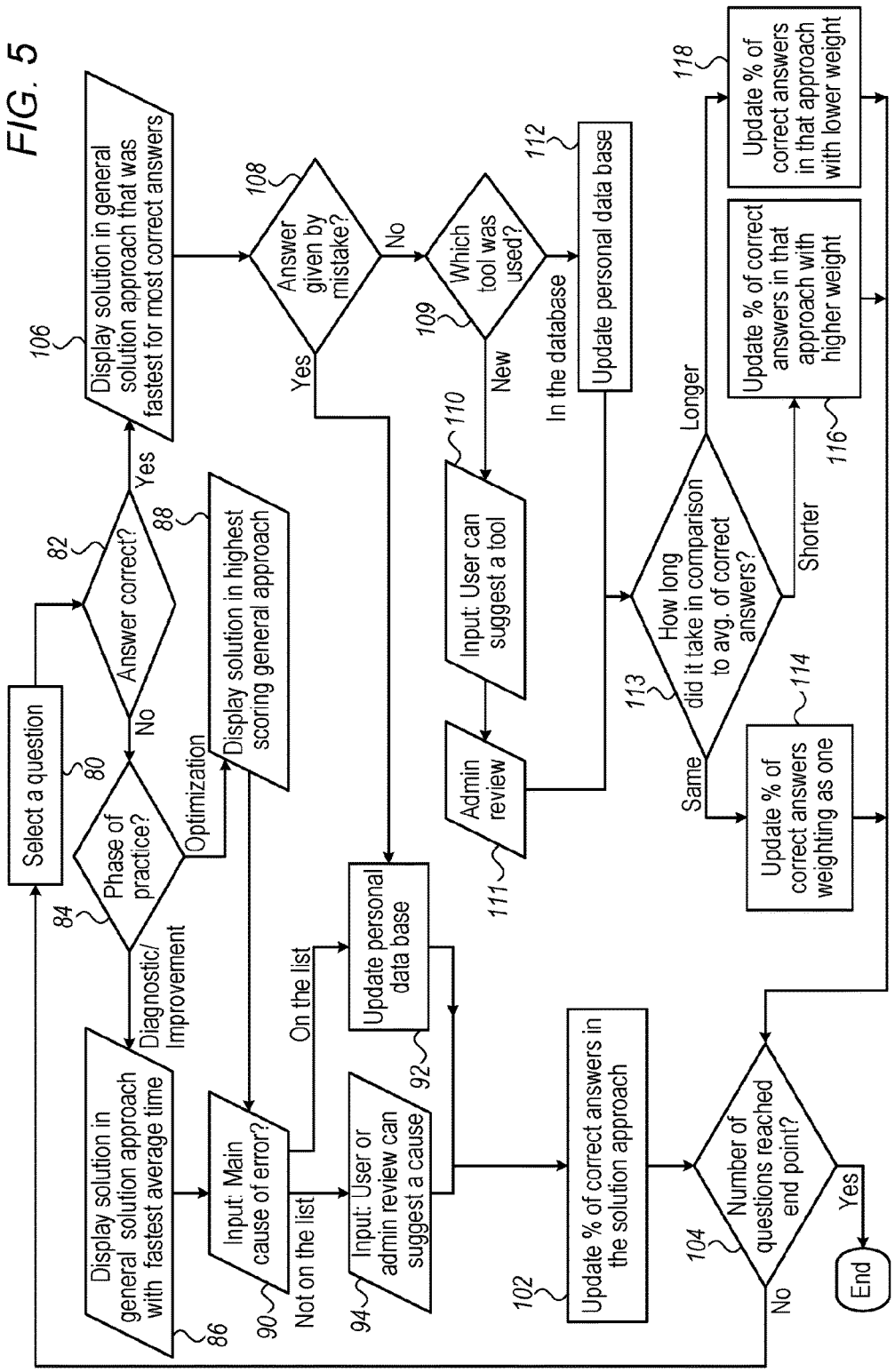
FIG. 5 is a flow chart that schematically shows details of a method for interactive training, in accordance with an embodiment of the invention.

FIG. 5 is a flow chart that schematically shows details of the present method for interactive training, in accordance with an embodiment of the invention. This flow chart illustrates specifically how server 28 interacts with client devices 24 and users 22 in the training phases noted above and, in particular, how the system behaves in the cases of correct and incorrect answers in all phases.

The process of FIG. 5 begins each time server 28 selects a question to present to user 22, at a question selection step 80. The server receives the user's response, and checks whether the answer chosen by the user is correct, at an answer checking step 82. When the answer is incorrect, the next action by the server depends upon the phase of training, as determined at a phase selection step 84. During the diagnostic and improvement phases, server 28 chooses a solution to present on client device 24 in the solution approach (precise, alternative, or logical) that had the fastest average solution time among other users who answered correctly, at a fastest solution step 86.

On the other hand, during the optimization phase, server 28 chooses the solution according to the solution approach that is most effective for this specific user, at an effective solution selection step 88. Server 28 can select the most effective solution approach using the effectiveness score defined above, i.e., selecting the general solution approach that received the highest effectiveness score.

Additionally or alternatively, server 28 may scale the solution approaches relatively according to their "effective time" for this specific user, calculated as follows:

Effective time=(Average number of seconds it took the user to answer correctly using this tool in past questions)×(Average number of seconds it took correct answers who used this tool in this question)

The lower the effective time is, the better this tool is forecast to be for this specific user. For example, if in the past it took the user an average of 30 seconds to answer correctly when he or she used tool A, and if on average it took 60 seconds for answers who answered this specific question correctly using approach A, then the effective time of tool A for this user is 30×60=1,800. If the effectiveness of approach B is 2,000, and the effectiveness of approach C is 3,500, then server 28 will choose the solution to present to the user in the approach having the lowest effective time: approach A in the present example.

After presenting the most advisable solution at step 86 or 88, server 28 asks user 22 to indicate which cause, from a given list, was the main reason for his or her error, at a mistake input step 90. Assuming the user finds the reason for the error in the list, server 28 uses this information in updating personal database 38 for this user, at a first personal database update step 92. As a result, server 28 modifies the rankings (as illustrated in FIGS. 4C-D, for example) or scores of entries 70 so that the relative difficulty level of all questions that are tagged in general database 36 as having this same reason for mistake is increased. On the other hand, if the user's reason does not appear on the list presented by server 28 at step 90, the user can add the reason as free text, at a new reason entry step 94. Server 28 can add this reason to general database 36, typically after review and approval by operator 42.

Server 28 updates general database 36 with the new percentage of correct answers found by the suggested solution approach, at a percentage update step 102. The server then evaluates whether the current training session has reached its endpoint, at a termination checking step 104. The session may end when a certain number of questions have been answered or a certain length of time has elapsed, or when certain training goals have been achieved. Until the endpoint is reached, server 28 cycles to the next question at step 80.

Returning now to step 82, when user 22 chooses the correct answer, server 28 displays the solution found by the approach that is identified in general database 36 as having been the fastest on average among other users, at a solution display step 106. The purpose of this step is not only in order to expose the user to the solution that proved to be the fastest, but mainly in order to verify that the user answered correctly for the right reasons (i.e., the user understood the question and solved it, rather than guessed or found the right solution coincidentally by incorrect reasoning). Server 28 asks the user whether the answer was given by mistake, at a mistake checking step 108. If the answer is yes, server 28 treats the user's response as a wrong answer and proceeds to step 92.

If the answer was not given by mistake, server 28 prompts user 22 to indicate which of the available solution tools he or she used in finding the answer to the question, at a tool input step 109. At this step, user 22 may select a tool that is already listed in general database 36 for the present question. If there is currently no such solution tool in database 36, server 28 prompts the user to suggest his or her own solution tool, at a new tool input step 110. When the user suggests a new tool at step 110, administrator 42 reviews the choice of tool and may tag it as belonging to the present question, at a review step 111.

Once user 22 has selected the tools that he or she used in answering the present question at step 109, server updates the user's personal database 38, at an alternative personal database update step 112. In this step, server 28 decreases the difficulty level in personal database 38 of all other questions that are tagged in general database 36 as having the same tools for solution, as explained above.

The server then compares the time it took the user to answer to the average time it took other users to give correct answers to the same question, at a time comparison step 113. On this basis, the server computes a weighted update to the percentage of correct answers listed in the entry for this question in general database 36 with respect to the approach indicated at step 110:

If user took exactly the same as the average time, server 28 weights the correct answer as one answer in computing the updated percentage, at a non-weighted update step 114. For example, assuming that there are only two solution approaches, A and B, to this question, and only two correct answers are listed in general database 36 so far, one found using approach A and the other using approach B, both in 30 seconds, the corresponding entry will indicate prior to step 114 that 50% of the correct answers to the question had been found by each approach. Now assume that another correct answer was given at step 82, which took 30 seconds to find, as well, using approach A. This answer will be weighted as one, so that two correct answers will now have been given using approach A, and one correct answer using approach B. Approach A is now listed in database 36 as accountable for $$\frac{2}{2+1} = 66.67\%$$

of the correct answers to this question, and approach B for the other 33.33%.

If the user took less than the average time, server 28 weights the correct answer with a weight greater than one in computing the updated percentage, at an up-weighted update step 116. For instance, server 28 can weight the correct answer as (100+n) % answers, wherein n is a positive number smaller than 100 that can be predefined by operator 42. Continuing with the preceding example with two general solution approaches, A and B, and two correct answers in general database 36 prior to step 116, we now assume another correct answer is given, which took 20 seconds using approach A. Setting n to the value 33, for example, the answer given at step 82 will be weighted as (100+33)%=133%, so that 2.33 correct answers will effectively have been given using approach A, while one correct answer was given using approach B. Approach A is now weighted as accountable for $$\frac{2.33}{2.33+1} = 70\%$$

of the correct answers, and approach B for the other 30%.

If the user took more than the average time, server 28 weights the correct answer with a weight less than one in computing the updated percentage, at a down-weighted update step 118. In this case, server 28 can weight the correct answer as (100−m) % answers, wherein m is a positive number smaller than 100 that is predefined by operator 42. The server proceeds to update the correct solution percentages in the manner described above.

Server 28 then proceeds to step 104, where it either terminates the session or returns to step 80 to select the next question.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A training system, comprising:
a network interface, which is configured to communicate over a network with client computing devices operated by multiple users of the system;
a memory, which is configured to hold:
a general database, containing first entries corresponding to training problems and comprising respective general ranking data based on solutions given by the multiple users to the training problems, wherein at least some of the training problems are associated with multiple solution approaches; and
multiple personal databases, each personal database assigned to a respective individual user and containing second entries corresponding to the training problems and comprising respective personal ranking data based on the solutions given by the individual user to the training problems; and
a processor, which is configured to select the training problems to present to each individual user based on both the general ranking data in the general database and the personal ranking data in the personal database that is assigned to the individual user, to transmit the selected training problems over the network to a client device operated by the individual user, to receive the solutions to the training problems entered in the client device by the individual user, and to continually update both the general ranking data and the personal ranking data responsively to the received solutions, such that the processor automatically tailors training problems provided to each individual user during a respective training program, based on a continually updated assessment of abilities of the individual user,
wherein the processor sets an initial structure and ranking of entries in each of the multiple personal databases and continues to update the general database and the multiple personal databases based on accumulated interaction with the multiple users, and wherein changes in the multiple personal databases due to correct and incorrect user solutions to the training problems are reflected back to the rankings in the general database,
wherein the processor is configured to determine, for at least some of the received solutions, a solution approach from the multiple solution approaches, used by the user in selecting the received solution, to determine a ranking of the user for each of the multiple solution approaches, responsive to the received solutions and the determined solution approaches, and to automatically select training material to be presented to the individual user responsive to the rankings of the multiple solution approaches, and to provide the selected training material through the network interface to the client computing devices for presentation.

2. The system according to claim 1, wherein the processor is configured to update the general and personal ranking data responsively to numbers of correct and incorrect solutions entered by the users.

3. The system according to claim 1, wherein the processor is configured to update the general and personal ranking data responsively to times taken by the users to enter the solutions.

4. The system according to claim 1, wherein the processor is configured, upon receiving a solution to a given training problem that is incorrect from the individual user, to prompt the individual user to enter metadata regarding the incorrect solution, and to enter the metadata in an entry corresponding to the given training problem in the general database, and wherein the processor is configured to select training material to be presented to the individual user responsive to the metadata regarding the incorrect solution.

5. The system according to claim 4, wherein the processor is configured, in response to the incorrect solution, to update the personal ranking data with respect to a plurality of the entries in the personal database to which the metadata applies.

6. The system according to claim 4, wherein the metadata comprises a reason for having made a mistake in giving the incorrect solution.

7. The system according to claim 1, wherein the training problems comprise multiple-choice questions used in aptitude tests, and wherein the solution approaches comprise precise, alternative, and logical approaches.

8. The system according to claim 1, wherein the processor is configured to determine the approach used in selecting the received solution by prompting the user to indicate the solution approach used in providing a received solution, and receiving an indication of the solution approach from the user responsive to the prompt.

9. The system according to claim 8, wherein the processor is configured to provide the user with multiple solution approaches associated with the training problem, with an indication to select one of the solution approaches, in prompting the user to indicate the solution approach.

10. The system according to claim 1, wherein the processor is configured to determine the rankings of the solution approaches responsive to times it took the user to provide correct answers using the solution approach.

11. The system according to claim 1, wherein the selection of the training material comprises selecting training problems responsively to the solution approaches associated with the training problems.

12. The system according to claim 1, wherein the selection of the training material comprises setting difficulty levels of problems according to the solution approach rankings and selecting problems based on the difficulty levels.

13. The system according to claim 1, wherein the selection of the training material comprises selecting for a training problem associated with multiple solution approaches a solution to be presented to the user in accordance with a solution approach having a highest solution approach ranking for the user.

14. The system according to claim 1, wherein the selection of the training material comprises selecting for a training problem associated with multiple solution approaches a solution to be presented to the user, by calculating for each of the multiple solution approaches an effective time as a function of both the users average time in solving other training problems using the solution approach and an average time required by other users in solving the training problem with the solution approach.

15. The system according to claim 1, wherein the processor is configured to receive from the individual user input regarding a reason for selecting at least some of the solutions to the training problems and to select training material to be presented to the individual user responsive to the user input regarding a reason for selecting at least some of the solutions and to the solutions to the training problems entered in the client device by the individual user.

16. The system according to claim 15, wherein the processor is configured to receive from the multiple users input regarding a reason for selecting at least some of the solutions to the training problems and to select training material to be presented to the individual user responsive to both the reason input from the individual user and the reason input from the multiple users.

17. The system according to claim 15, wherein the input regarding a reason for selecting at least some of the solutions comprises a reason for having made a mistake in giving an incorrect solution, provided by the individual user after being notified that a solution to a problem was incorrect.

18. The system according to claim 15, wherein the input regarding a reason for selecting at least some of the solutions comprises a solution approach used in selecting a corresponding solution.

19. The system according to claim 15, wherein the training material selected responsively to the user input regarding a reason for selecting at least some of the solutions comprises further training problems.

20. The system according to claim 15, wherein the training material selected responsively to the user input regarding a reason for selecting at least some of the solutions comprises a solution explanation to a problem, and wherein the processor is configured to select the training material to be presented to the individual user from among a plurality of solution explanations in accordance with different solution approaches responsively to the user input regarding a reason for selecting at least some of the solutions.

21. A method for training, comprising:
establishing communications over a network between a training server and client computing devices operated by multiple users;
maintaining a general database, containing first entries corresponding to training problems and comprising respective general ranking data based on solutions given by the multiple users to the training problems, wherein at least some of the training problems are associated with multiple solution approaches;
maintaining multiple personal databases, each personal database assigned to a respective individual user and containing second entries corresponding to the training problems and comprising respective personal ranking data based on the solutions given by the individual user to the training problems;
selecting the training problems to present to each individual user based on both the general ranking data in the general database and the personal ranking data in the personal database that is assigned to the individual user;
transmitting the selected training problems from the server over the network to a client device operated by the individual user;
receiving at the server the solutions to the training problems entered in the client device by the individual user;
determining, for at least some of the received solutions, a solution approach from the multiple solution approaches, used by the user in selecting the received solution, to determine a ranking of the user for each of the multiple solution approaches, responsive to the received solutions and the determined solution approaches;
automatically selecting training material to be presented to the individual user responsive to the rankings of the multiple solution approaches; and
continually updating both the general ranking data and the personal ranking data responsively to the received solutions, such that the training server automatically tailors training problems provided to each individual user during a respective training program, based on a continually updated assessment of abilities of the individual user,
wherein the training server sets an initial structure and ranking of entries in each of the multiple personal databases and continues to update the general database and the multiple personal databases based on accumulated interaction with the multiple users, and wherein changes in the multiple personal databases due to correct and incorrect user solutions to the training problems are reflected back to the rankings in the general database.

22. The method according to claim 21, wherein maintaining the general and personal databases comprises updating the general and personal ranking data responsively to numbers of correct and incorrect solutions entered by the users.

23. The method according to claim 21, wherein maintaining the general and personal databases comprises updating the general and personal ranking data responsively to times taken by the users to enter the solutions.

24. The method according to claim 21, and comprising, upon receiving a solution to a given training problem that is incorrect from the individual user, prompting the individual user to enter metadata regarding the incorrect solution, and entering the metadata in an entry corresponding to the given training problem in the general database, wherein selecting the training material to be presented to the individual user comprises selecting responsive to the metadata regarding the incorrect solution.

25. The method according to claim 24, wherein maintaining the personal databases comprises updating, in response to the incorrect solution, the personal ranking data with respect to a plurality of the entries in the personal database to which the metadata applies.

26. The method according to claim 24, wherein the metadata comprises a reason for having made a mistake in giving the incorrect solution.

27. The method according to claim 21, wherein the training problems comprise multiple-choice questions used in aptitude tests, and wherein the solution approaches comprise precise, alternative, and logical approaches.

28. A computer software product, comprising a non-transitory computer-readable medium in which program instructions are stored, which instructions, when read by a computer, cause the computer:
to establish communications over a network with client computing devices operated by multiple users;
to maintain a general database, containing first entries corresponding to training problems and comprising respective general ranking data based on solutions given by the multiple users to the training problems, wherein at least some of the training problems are associated with multiple solution approaches;
to maintain multiple personal databases, each personal database assigned to a respective individual user and containing second entries corresponding to the training problems and comprising respective personal ranking data based on the solutions given by the individual user to the training problems;

to automatically select the training problems to present to each individual user based on both the general ranking data in the general database and the personal ranking data in the personal database that is assigned to the individual user;

to transmit the selected training problems over the network to a client device operated by the individual user;

to receive the solutions to the training problems entered in the client device by the individual user;

to determine, for at least some of the received solutions, a solution approach from the multiple solution approaches, used by the user in selecting the received solution, to determine a ranking of the user for each of the multiple solution approaches, responsive to the received solutions and the determined solution approaches;

to select training material to be presented to the individual user responsive to the rankings of the multiple solution approaches; and to continually update both the general ranking data and the personal ranking data responsively to the received solutions, such that the processor automatically tailors training problems provided to each individual user during a respective training program, based on a continually updated assessment of abilities of the individual user, wherein the computer sets an initial structure and ranking of entries in each of the multiple personal databases and continues to update the general database and the multiple personal databases based on accumulated interaction with the multiple users, and wherein changes in the multiple personal databases due to correct and incorrect user solutions to the training problems are reflected back to the rankings in the general database.

29. The product according to claim 28, wherein the instructions cause the computer to update the general and personal ranking data responsively to numbers of correct and incorrect solutions entered by the users.

30. The product according to claim 28, wherein the instructions cause the computer to update the general and personal ranking data responsively to times taken by the users to enter the solutions.

31. The product according to claim 28, wherein the instructions cause the computer, upon receiving a solution to a given training problem that is incorrect from the individual user, to prompt the individual user to enter metadata regarding the incorrect solution, and to enter the metadata in an entry corresponding to the given training problem in the general database, and wherein the program instructions cause the computer to select training material to be presented to the individual user responsive to the metadata regarding the incorrect solution.

32. The product according to claim 31, wherein the instructions cause the computer, in response to the incorrect solution, to update the personal ranking data with respect to a plurality of the entries in the personal database to which the metadata applies.

33. The product according to claim 31, wherein the metadata comprises a reason for having made a mistake in giving the incorrect solution.

34. The product according to claim 28, wherein the training problems comprise multiple-choice questions used in aptitude tests, and wherein the solution approaches comprise precise, alternative, and logical approaches.

* * * * *